April 7, 1953

R. C. CARLSON 2,634,184

PHONOGRAPH CABINET

Filed Aug. 28, 1948

2 SHEETS—SHEET 1

INVENTOR.

Reuben C. Carlson

BY

J. W. Douglas

Atty.

PHONOGRAPH CABINET

Filed Aug. 28, 1948

INVENTOR.
Reuben C. Carlson
BY
J. D. Douglas
Att'y.

Patented Apr. 7, 1953 2,634,184

UNITED STATES PATENT OFFICE 2,634,184

PHONOGRAPH CABINET

Reuben C. Carlson, Chicago, Ill., assignor to Admiral Corporation, Chicago, Ill., a corporation of Delaware Application August 28, 1948, Serial No. 46,649

2 Claims. (Cl. 312—8)

This invention relates to the structure of a cabinet, and particularly to a cabinet for an automatic record player of the class which is adapted to receive records through a slot in the cabinet.

In greater detail the invention comprehends means including safety elements in association with a cabinet at an opening in one of the walls thereof, the elements providing a slot through which records are adapted to be passed to a record player within the cabinet and also affording means by which the slot can be altered to provide an aperture large enough for records to be retrieved therethrough from the record player, in an emergency. The invention further includes additional movable means for completely closing the opening in the cabinet to obscure from view, those elements which are adapted to provide the slot, and alternately for rendering the slot accessible for passage of records to the record player. The cabinet is particularly designed for a record player of the type disclosed in my copending application, Ser. No. 41,388, filed July 29, 1948.

Although automatic record players, housed within cabinets by which each is substantially inaccessible, to an operator, and having a slot in one of the walls thereof through which records are adapted to be passed to a record player are known to the phonograph art, these record players have lacked some means by which the records could be retrieved from the record playing mechanism, once they were passed through the slot, if and when an emergency made it desirable that the records be removed. Furthermore, the slot involved a break in the continuity of the surface of a cabinet which marred its appearance.

By the present invention I have overcome both of the foregoing disadvantages. The first I have overcome by providing an opening in the cabinet of my record player at which opening is supported elements adapted to provide a slot through which records are adapted to be passed to the record player, one of the elements being movable with respect to a stationary element attached to the cabinet at the opening and thereby capacitated to provide, in an emergency, an opening through which the hand of an operator can be extended and an objectionable record or records may be removed from the record player. The second disadvantage I have overcome by providing a door to close the opening in the cabinet and thereby obscure the slot and parts providing the same.

Other advantages of the invention will be apparent from the following specification when considered in conjunction with the accompanying drawings in which.

Figures 1, 2, 3:
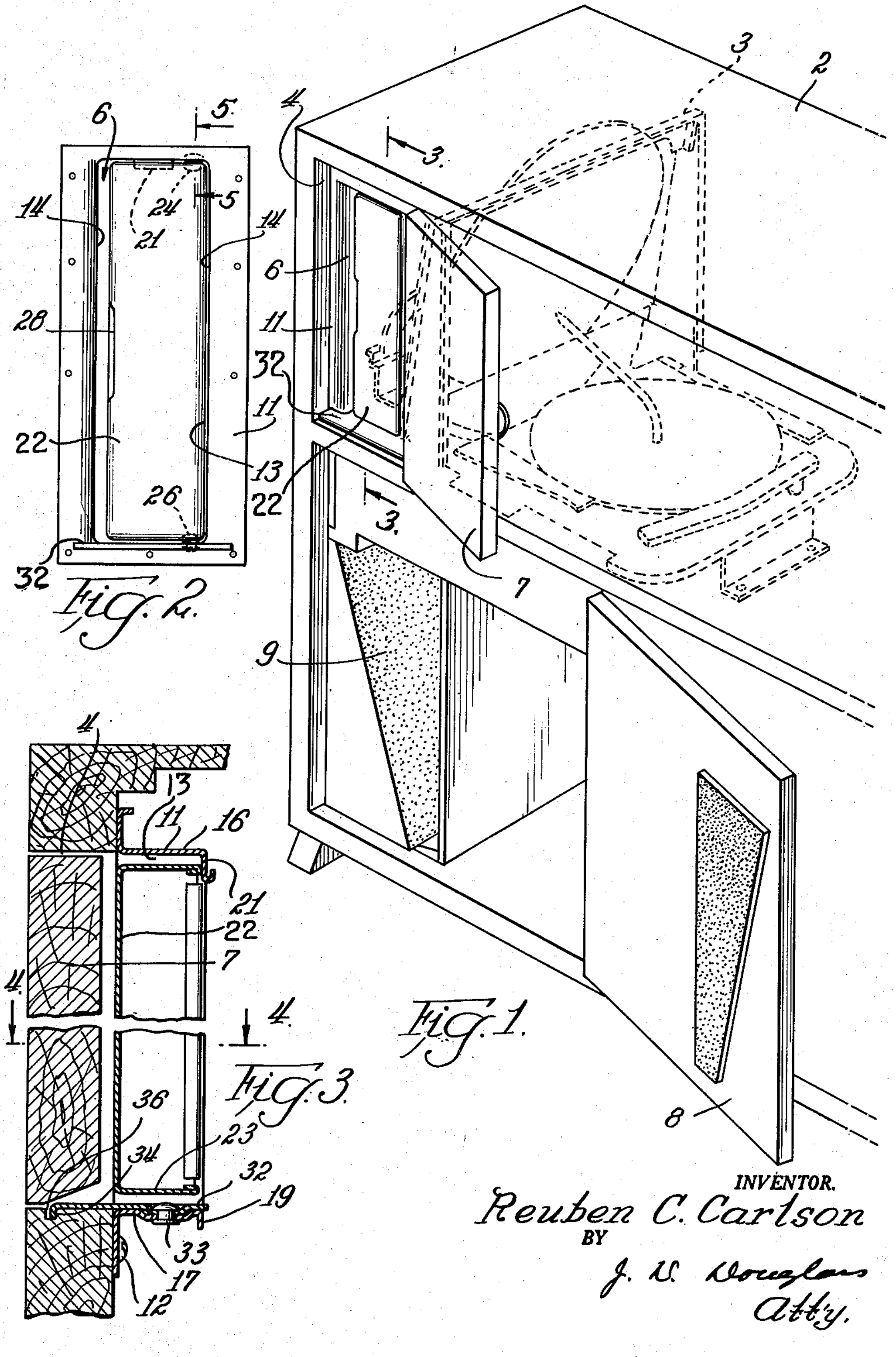
Fig. 1 is a perspective view of a cabinet, for a record player, in which is incorporated my improved record slot.
Fig. 2 is a front elevational view of the elements providing the slot.
Fig. 3 is a vertical section taken on line 3—3 of Fig. 1.

In Fig. 1 wherein for the purpose of illustration, is shown one embodiment of the invention, the reference character 2 is used to denote a cabinet which is commonly known to the trade as a console. The cabinet is adapted to house, in addition to a record player indicated in its entirety by the reference character 3, a radio or television receiving set. The record player is of the class which is fully automatic since it is adapted to receive records through a slot in the cabinet after which the records are not touched by the hand of an operator until they have been reproduced and deposited in a played or rejected record compartment. In keeping with these features, the front of the cabinet is provided with a rectangular opening 4 which is nearly closed by means, later to be described, providing a slot 6 through which records are adapted to be passed to the record player 3. The slot 6, and elements providing the same are adapted to be hidden from view by a door 7 associated with the cabinet at the opening 4 which the door is adapted to close. Below the level of the door 7 is a second door 8 adapted to close the rejected record compartment 9 into which records are transferred after they have been reproduced.

Figure 4:
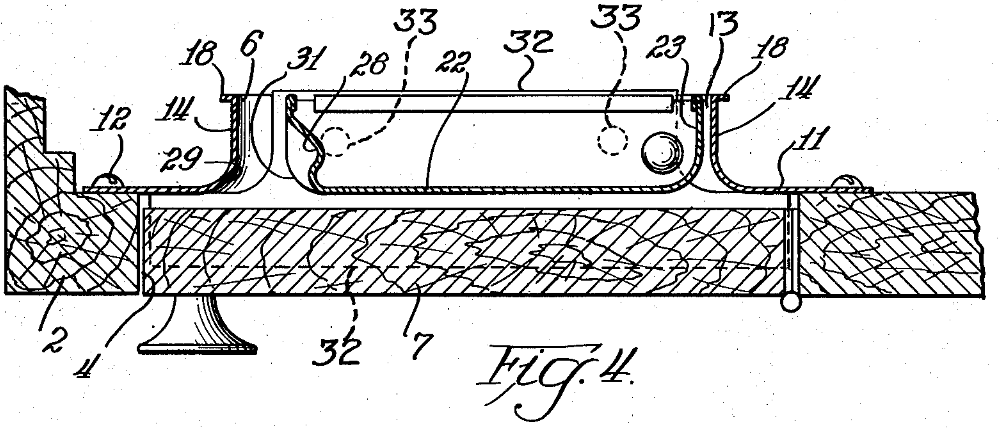
Fig. 4 is a transverse section taken on line 4—4 of Fig. 3.
Figure 5:
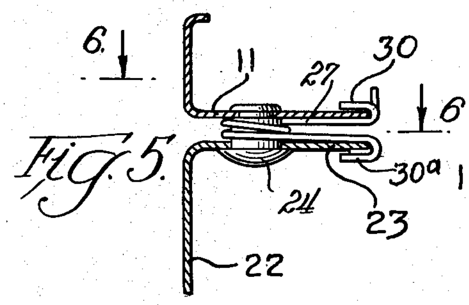
Fig. 5 is a vertical section taken on line 5—5 of Fig. 2.
Figure 6:
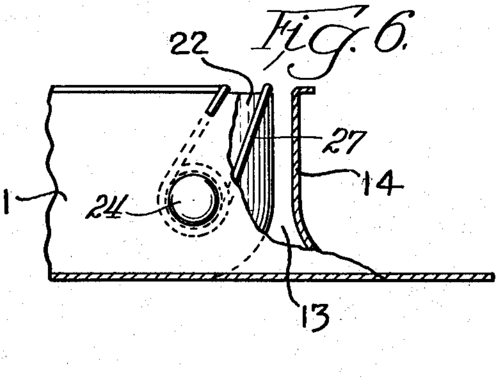
Fig. 6 is a horizontal section taken on line 6—6 of Fig. 5.

Means to provide the slot 6 includes a frame or door casing 11 (Fig. 2) which is rectangular in formation and preferably of sheet metal. It is wider than the opening 4 (Fig. 4) so that its edges overlap those regions of the cabinet defining the vertical walls of the opening 4 over which the casing is secured by screws 12. Centrally thereof, the casing 11 includes a rectangular aperture 13 bounded by vertical walls 14 and horizontal walls 16 and 17 (Fig. 3) struck rearwardly from the front of the casing 11. Additionally, the walls 14 (Fig. 4) may be bent sharply adjacent their free edges as at 18 so as to extend away from each other and thereby add to the rigidity of the walls. Also for the sake of rigidity the lower wall 17 includes a lip 19 bent downwardly, while from the upper wall 16 a stop member 21 is struck downwardly partly to add rigidity to the wall 16 and partly as a means for limiting the inward motion of a door 22 supported within the aperture 13 by means to be described hereinafter.

The door 22 like the casing 11 is preferably of sheet metal and of rectangular formation. Although it is only slightly shorter in length than the length of the aperture 13, it is narrower than the width of the aperture by a substantial amount. Because of this difference in width I am able to mount the door laterally of the aperture and thereby provide the slot 6. Preferably the slot is wide enough to accommodate a group of as many as three records at a time and therefore dimensionally about three-eighths of an inch in width when the door 22 is substantially closed. The door 22 includes a flange 23 struck rearwardly from the edge thereof through which similar shouldered pintles 24 and 26 extend, the pintles being fixed to the walls 16 and 17 of the door casing to provide a pivotal axis for the door. Each of the pintles has a torsion spring 27 coiled about it, the ends of which are provided with hooked portions 30 and 30a engaging the edges of the members 27 and 23 respectively, adapted to urge the door 22 against the stop 21.

In operation of the record player, it could happen that an attendant might insert records through the slot faster than the machine could play them, in which event a consequent accumulation of records could interfere with the normal operation of the record player. It could also happen that the attendant might insert through the slot a record too defective for satisfactory reproduction, or a record having an undesired reproduction thereon. In such an event the door 22 can be opened and the record or records removed from the record player after which the springs 27 swing the door back into engagement with the stop 21. To facilitate opening of the door 22 the flange 23, at the slot 6, is deformed inwardly thereof to provide an elongated pocket 28 adapted to be grasped by the fingers of an attendant.

Provision has been made to facilitate entry of records into the slot 6. This is carried into effect by providing an arcuate region 29 (Fig. 4) throughout the length of the side wall 14 at the front of the casing 11. Also, the corner of the door, at the front thereof adjacent the slot, is also arcuate in transverse cross section at 31. Owing to these structural characteristics, if an attempt to pass records to the record player is carried out carelessly, one of the records striking either of the regions 29 or 31, then the record is deflected into the slot.

Means is provided to prevent scratching and undue wear of the cabinet, at the base of slot 6, by records as they are inserted into the slot. Said means includes a guard 32 which may take the form of a plate of metal rigidly attached to the base wall 17 of the aperture in any convenient manner such as by rivets 33. The guard 32 extends outwardly of the casing 11 and terminates in a flange 34 extending downwardly into a groove 36 in the cabinet 2. If desired, the guard 32 may extend throughout the length, substantially, of the opening 4.

Figure 7:
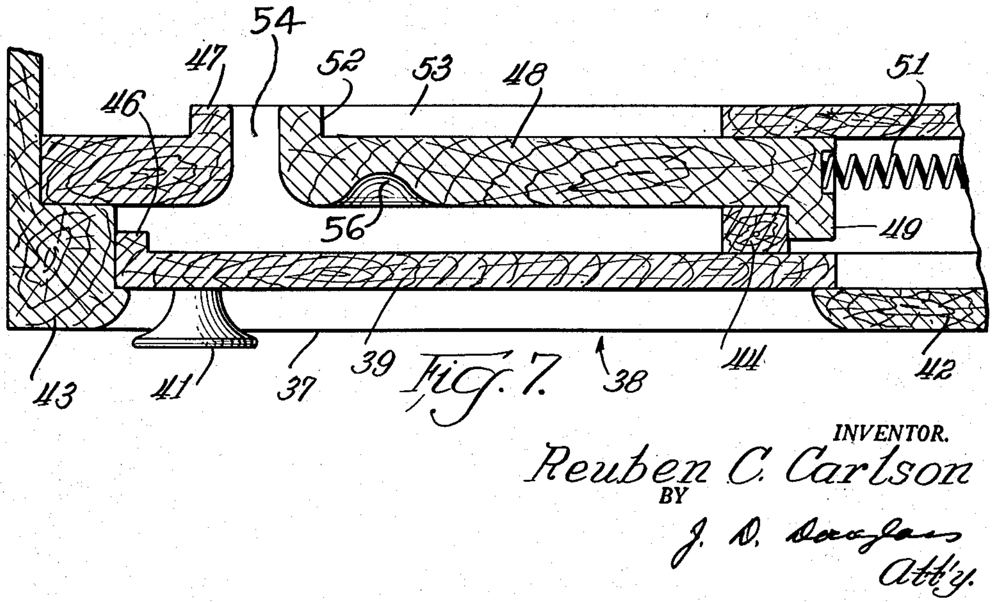
Fig. 7 is a second embodiment of the invention, in transverse section, corresponding to the section indicated in Fig. 4.

The alternative construction shown in Fig. 7 involves a slot which is provided by means including a longitudinally slidable door. In this embodiment the cabinet, represented by the character 37, has an opening 38 therein which is adapted to be closed by a door 39, a handle 41 thereon affording means for sliding the door longitudinally thereof through a predetermined course adjacent a front wall 42 between limits provided by a corner pilaster 43 and a vertical stop member 44 behind the door, said vertical stop member being adapted to be engaged by a vertical rib 46 on the door. Behind the door 39 a door casing 47 is provided, in rigid connection with the cabinet, while in association with the casing 47 a door 48 is slidable longitudinally thereof between limits provided by the vertical stop member 44, against which a vertical lug 49 of the door is normally adapted to be pressed by a spring 51, and a second lug 52, on the door, adapted to engage that portion of the casing defining an aperture 53 in the door casing 47. As will be noted, the door when in normal position is spaced from the left side of the aperture 53 thereby providing a slot 54 through which records may be passed to a record player within the cabinet. In an emergency the door 48 is adapted to be opened by sliding it to the right, from the position indicated, against the resistance of spring 51 so that a record or records may be removed from the record player. To facilitate opening of the door a groove 56, adapted to be engaged by the fingers of a person, is provided adjacent the left side of the door.

Having thus described my invention in two embodiments thereof, I am aware that numerous and extensive departures may be made therefrom without departing from the spirit or scope of my invention.

I claim:

1. The combination with a cabinet having an opening in one of the walls thereof and a record player housed in the cabinet, of a door casing attached to said cabinet at said opening, said casing having an aperture therein, a swingable safety member, pivotal means to secure said safety member to said casing adjacent said opening, stop means on said casing at said opening, resilient means about the axis of said pivotal means to bias said safety member toward said stops and thereby provide with said casing a slot adapted to provide for passage of a record to said record player, guide surfaces on said safety member and said casing to convey a record into said slot, means in connection with said safety member by which it is adapted to be grasped and swung away from said stops to provide for removal of a record from said record player, a door, and means by which said door is coupled to said cabinet for closing the opening therein and thereby obscuring the elements providing said slot.

2. The combination with a cabinet having an opening in one of the walls thereof the cabinet being for a record player adapted to receive for reproduction records through a slot, of means to provide a slot at the opening in said cabinet including a door casing, said door casing having an aperture therein, a safety member, pivotal means by which said safety member is in swingable relationship to said door casing at said aperture thereby providing therewith a slot through which records are adapted to be passed and through which records are adapted to be retrieved in an emergency on swinging said safety member by the agency of said pivotal means, and a guard member between said safety member and said door casing in extension over one of the surfaces defining said opening to protect said surface from wear by passage of records through said slot.

REUBEN C. CARLSON.

REFERENCES CITED

The following references are of record in the file of this patent:

UNITED STATES PATENTS

| Number | Name | Date |
|---|---|---|
| 1,006,481 | Johnson | Oct. 24, 1911 |
| 1,124,655 | Powell | Jan. 12, 1915 |
| 2,130,617 | Dockham | Sept. 20, 1938 |